United States Patent Office 3,161,665
Patented Dec. 15, 1964

3,161,665
1,3-CYCLOBUTANEDIISOCYANATES
James C. Martin, Kingsport, Tenn., assignor to Eastman Kodak Company, Rochester, N.Y., a corporation of New Jersey
No Drawing. Filed Apr. 30, 1963, Ser. No. 277,018
7 Claims. (Cl. 260—453)

This invention relates to organic diisocyanates having improved stability.

The organic diisocyanates of the invention are 1,3-cyclobutanediisocyanates substituted in the 2 and 4-positions with alkyl groups and have the general formula

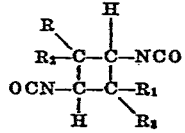

wherein R and $R_1$ represent alkyl groups of 1 to 12 carbon atoms and $R_2$ and $R_3$ represent hydrogen or alkyl groups of 1 to 12 carbon atoms. The alkyl groups can be straight or branch-chained.

Difunctional isocyanates have been known for a number of years. Several have been reported by R. G. Arnold, J. A. Nelson and J. J. Verbane in Chem. Rev., 57, 47–76 (1957). J. H. Saunders and R. J. Slocombe in Chem. Rev., 43, 203–218 (1948) reported that generally isocyanates are extremely hygroscopic and special handling and storage is required to protect them from water. Thus care must be used in drying equipment used in handling them. It is also well known, as described by Bloom et al. U.S. Patent 2,891,983, that isocyanates such as 4,4′-methylenebis(phenylisocyanate) and cyclohexylene-diisocyanate undergo polymerization soon after preparation and require the addition of stabilizing agents to inhibit polymerization.

I have discovered that unexpectedly the 2,4-alkyl-1,3-cyclobutanediisocyanates are highly stable in the presence of moisture and do not readily undergo polymerization during storage. These diisocyanates can therefore be stored for several months at room temperature with no adverse effects, and they can be transferred in a normal atmosphere without fear of contamination by atmospheric moisture. However, this increased stability to moisture and polymerization does not adversely affect usage of the diisocyanates for example for the preparation of polymers. These properties represent a substantial advantage especially where diisocyanates are used in the preparation of high molecular polymers, because side reactions during polymer build-up are most undesirable.

The improved stability of the diisocyanates is believed to be due to the alkyl substitution in the 2 and 4-positions of the cyclobutane ring.

The diisocyanates are preferably prepared by reaction of the corresponding diamines or their salts with phosgene at temperatures of the order of 60° to 400° C., preferably 100° to 220°, as illustrated in Example 1. Other less preferred methods which can be used include use of the Curtius, Hoffman and Lossen rearrangements of acid azides, amides and hydroxamic acids, respectively.

Representative diamines useful in the preparation of the diisocyanates are the following:

2,2,4,4-tetramethyl-1,3-cyclobutanediamine
2,2,4,4-tetraethyl-1,3-cyclobutanediamine
2,2,4,4-tetrabutyl-1,3-cyclobutanediamine
2,4-diethyl-2,4-dimethyl-1,3-cyclobutanediamine
2,4-dimethyl-2,4-dipropyl-1,3-cycobutanediamine
2,4-dibutyl-2,4-diethyl-1,3-cyclobutanediamine
2,4-didecyl-1,3-cyclobutanediamine
2,4-dioctyl-1,3-cyclobutanediamine
2,4-didecyl-1,3-cyclobutanediamine
2,4-didodecyl-2,4-dimethyl-1,3-cyclobutanediamine
2,4-diisopropyl-2,4-dimethyl-1,3-cyclobutanediamine The diamines can be prepared as described in Elam et al U.S. Patent 3,017,395 by hydrogenation of the corresponding cyclobutane-1,3-dioximes such as 2,2,4,4-tetraalkylcyclobutane-1,3-dione, dioxime.

The following examples will serve to illustrate the preparation of the diisocyanates of the invention.

Example 1

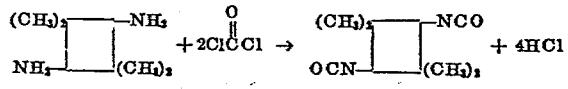

A solution of 284 g. (2.0 moles) of 2,2,4,4-tetramethyl-1,3-cyclobutanediamine in 2500 ml. of o-dischlorobenzene was cooled to 0° and 426 g. (4.25 moles) of phosgene was added. A large quantity of gelatinous material was formed. This mixture was stirred and the temperature was slowly raised to 110° over a period of 3 hrs. Most of the solid disappeared. More phosgene, 100 g., was added and heating was continued at 125° for 4 hrs. Distillation of the reaction solution through a 12-in. packed column gave 217 g. (56%) of 2,2,4,4-tetramethyl-1,3-cyclobutanediisocyanate, B.P. 91–93° (5 mm.), $n_D^{20}$ 1.4691. Analysis.—Calcd. for $C_{10}H_{14}N_2O_2$: C, 61.9; H, 7.2; N, 14.4. Found: C, 61.8; H, 7.3; N, 14.2. Purity 99.6%, by the method of S. Siggia, "Quantitative Organic Analysis Via Functional Groups," John Wiley and Sons, Inc., New York, N.Y., 1949, p. 104.

A sample of this isocyanate was assayed after remaining at room temperature for six months and found to have a purity of 99.0%.

Example 2

A solution of 198 g. (1 mole) of 2,2,4,4-tetraethyl-1,3-cyclobutanediamine in 1500 ml. of chlorobenzene was refluxed and phosgene was passed in until the evolution of hydrogen chloride ceased. Distillation of the reaction solution through a 10-in. packed column yielded 163 g. of 2,2,4,4-tetraethyl-1,3-cyclobutanediisocyanate, B.P. 105–106° (1 mm.). The purity by the assay method of Example 1 was 99.7%.

Example 3

Into a suspension of 50 g. of 2,4-dibutyl-2,4-diethyl-1,3-cyclobutanediamine dihydrochloride in 400 ml. of refluxing 1,2,4-trichlorobenzene was passed phosgene for several hours. When the evolution of hydrogen chloride ceased, the solution was distilled through a 10-in. packed column to give 24 g. of 2,4-dibutyl-2,4-diethyl-1,3-cyclobutanediisocyanate, B.P. 134–138° (1 mm.).

Example 4

2,4-diethyl-2,4-dimethyl-1,3-cyclobutanediisocyanate B.P. 84–88° (1 mm.) is prepared by the method of Example 1 except using 2,4-diethyl-2,4-dimethyl-1,3-cyclobutanediamine.

Example 5

2,4-dimethyl-2,4-dipropyl-1,3-cyclobutanediisocyanate B.P. 100–102 (1 mm.) is prepared by the method of Example 1 except using 2,4-dimethyl-2,4-dipropyl-1,3-cyclobutanediamine.

Example 6

2,4-diethyl-2,4-dioctyl-1,3-cyclobutanediisocyanate B.P. 100° (10µ) is prepared by the method of Example 1 except using 2,4-diethyl-2,4-dioctyl-1,3-cyclobutanediamine.

Example 7

2,4-didecyl-1,3-cyclobutanediisocyanate B.P. 85–90° (6μ) is prepared by the method of Example 1 except using 2,4-didecyl-1,3-cyclobutanediamine.

Other diisocyantes such as:

2,2,4,4-tetrabutyl-1,3-cyclobutanediisocyanate
2,4-dioctyl-1,3-cyclobutanediisocyanate
2,4-didodecyl-2,4-dimethyl-1,3 - cyclobutanediisocyanate and
2,4 - diisopropyl-2,4-dimethyl-1,3-cyclobutanediisocyanate having the above general formula are prepared as described in the above examples from the corresponding diamines abovementioned.

The diisocyanates of the invention described above are particularly suited to use in the preparation of polymers, for example, polyurethane polymers for use in textile materials, by condensation with glycols such as ethylene glycol and 1,4-cyclohexanedimethanol.

This invention has been described in considerable detail with particular reference to certain preferred embodiments thereof, but it will be understood that variations and modifications can be effected within the spirit and scope of the invention as described hereinabove, and as defined in the appended claims.

What I claim is:

1. A compound having the formula

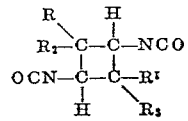

wherein R and $R_1$ each represent an alkyl group of from 1 to 12 carbon atoms and $R_2$ and $R_3$ each represent a member of the class consisting of hydrogen and an alkyl group of 1 to 12 carbon atoms.

2. A compound having the formula of claim 1 wherein R, $R_1$, $R_2$ and $R_3$ each represent an alkyl group of 1 to 12 carbon atoms.

3. 2,2,4,4-tetramethyl-1,3-cyclobutanediisocyanate.
4. 2,2,4,4-tetraethyl-1,3-cyclobutanediisocyanate.
5. 2,4-dibutyl-2,4-diethyl-1,3-cyclobutanediisocyanate.
6. 2,4-diethyl - 2,4 - dimethyl-1,3-cyclobutanediisocyanate.
7. 2,4 - dimethyl-2,4-dipropyl-1,3-cyclobutanediisocyanate.

No references cited.